W. GEBHARDT.
NUT CRACKING MACHINE.
APPLICATION FILED OCT. 29, 1912.

1,133,121.

Patented Mar. 23, 1915.
4 SHEETS—SHEET 1.

William Gebhardt, INVENTOR

W. GEBHARDT.
NUT CRACKING MACHINE.
APPLICATION FILED OCT. 29, 1912.

1,133,121.

Patented Mar. 23, 1915.
4 SHEETS—SHEET 3.

WITNESSES
Jas. K. M'Cathran
F. T. Chapman.

William Gebhardt, INVENTOR
BY
ATTORNEY

W. GEBHARDT.
NUT CRACKING MACHINE.
APPLICATION FILED OCT. 29, 1912.

1,133,121.

Patented Mar. 23, 1915.
4 SHEETS—SHEET 4.

WITNESSES
Jas. K. McCathran
F. J. Chapman.

William Gebhardt, INVENTOR
BY
E. G. Siggers
ATTORNEY

UNITED STATES PATENT OFFICE.

WILLIAM GEBHARDT, OF SAN ANTONIO, TEXAS, ASSIGNOR TO G. A. DUERLER MFG. CO., OF SAN ANTONIO, TEXAS, A CORPORATION OF TEXAS.

NUT-CRACKING MACHINE.

1,133,121.  Specification of Letters Patent. Patented Mar. 23, 1915.

Application filed October 29, 1912. Serial No. 728,430.

*To all whom it may concern:*

Be it known that I, WILLIAM GEBHARDT, a citizen of the United States, residing at San Antonio, in the county of Bexar and State of Texas, have invented a new and useful Nut-Cracking Machine, of which the following is a specification.

This invention has reference to improvements in nut cracking machines designed more especially for the cracking of pecan nuts, but applicable to the cracking of other types of nuts, and is an improvement on the machine shown and described in Letters Patent No. 842,398, for a nut cracking machine, granted to me January 29, 1907.

It is the object of the present invention to provide improved means for accomplishing certain of the operations set forth in the said Letters Patent, and also to provide certain wholly new means for accomplishing certain results not provided for in said Letters Patent.

The present invention has to do with the receiving hopper and feeding chute for the nuts, delivering the nuts to the cracking part of the machine, whereby the nuts are caused to assume a certain position to feed one by one in succession to the cracking mechanisms, and to then enter the cracking mechanisms in the appropriate position.

The invention also includes means for the automatic adjustment of the inner part of the cracking mechanisms during the cracking operation to accommodate the inner member to varying sizes of nuts within such narrow limits that the cracking is performed with certainty, although the hammer or movable member of the cracking mechanism has a fixed range of movement.

The invention will be best understood from a consideration of the following detailed description, taken in connection with the accompanying drawings forming a part of this specification, with the further understanding that while a practical form of the invention is illustrated in the drawings it is susceptible of other practical forms, wherefore the invention is not confined to any strict conformity with the showing of the drawings but may be changed and modified so long as such changes do not mark any material departure from the salient features of the invention.

Referring to the drawings, there is shown a base 1 which may be of appropriate form and construction for the purposes of the invention, and is customarily in the form of a casting of web and flange construction. At an appropriate point on the base there is erected a column 2 having an inclined upper end 3, it being understood that the base 1 when the machine is in operation rests upon a substantially level support, and in the following description the terms of position have reference to the machine in its normal working condition. At the upper end of the inclined portion 3 of the standard is a hopper 4 of a shape and size to receive a suitable quantity of pecan and other nuts, and as is the custom in hoppers, this hopper is contracted toward the lower end. Fast to the upper end of the standard 2 is a chute 5 customarily made of two matching parts each beveled at the upper end, as indicated at 6, and terminating at the lower end in a less beveled portion 7, while on the inner walls of these two members are formed matching longitudinal ribs 8. That portion of the chute which may be termed the front portion is provided with an appropriate number of spaced lugs 9 defining openings 10 between them, these openings extending longitudinally of the chute, so as to expose the interior thereof to view whenever desired, and screws 11 or other fastening means may traverse these lugs and the sides of the chute to hold the structure together.

Lodged in the chute is an elongated reciprocatory member 12 having longitudinal grooves 13 adapted to receive the ribs 8, thereby holding the reciprocatory member in the chute, but permitting longitudinal movement of the reciprocatory member. This reciprocatory member has parallel side walls 14 so that the member is in the form of a trough approximating U-shape in cross section, while the upper ends of the side walls are beveled toward the bottom of the trough-like member, as indicated at 15, and adjacent these bevel portions the walls are formed with a series of notches 16 defining blunt teeth between them. The other or lower end of the reciprocatory member conforms to the beveled end 7 of the chute.

On what may be termed the rear face of the reciprocatory member there is formed a block 17 having a transverse recess 18 in the face remote from the member 12, and this block 17 extends through a slot 19ᵃ in the corresponding face of the chute.

The post or standard 3 has spaced wings 19 on opposite sides between which the chute is lodged, and to which the chute is secured in any desirable position of adjustment by set screws 20 extending through the wings and engaging the side walls of the chute. That face of the hopper which may be termed the front face is cut away to receive a portion of an agitating roller 21, this roller comprising an intermediate cylindrical portion and expanding end portions 22, these expanding end portions being of frusto-conical shape and the walls of the hopper are suitably formed where entered by the roller to conform to the shape thereof. The peripheral portion of the roller is provided with a circular series of grooves defining teeth between them for a purpose which will presently appear. The roller 21 is mounted upon a shaft 23 journaled in suitable bearings 24 formed on or attached to the side walls of the hopper, and at one end this shaft carries a gear wheel 25. At one side of the bearing 24 for that end of the shaft 23 adjacent the gear wheel 25 the side of the hopper is provided with a boss 26 to which is secured a pin 27 projecting from the boss parallel with the shaft 23. Upon this pin there is mounted a pinion 28 meshing with a gear wheel 25, a cam 29 and a band wheel or pulley 30, these several parts being connected together for simultaneous movement, and they are held to the pin 27 by a set collar 31. The construction is such that when power is applied to the band wheel 30 to rotate it, the cam 29 and pinion 28 will rotate with the band wheel, thereby driving the roller or drum 21 in an appropriate direction.

The standard extension 3 is provided on opposite sides with bearings 32 for a rock shaft 33, the latter carrying a hub 34 with a radial finger 35 thereon in position to engage the groove 18 in the block 17 formed on the slidable member 12, the finger terminating in a rounded portion 36 where engaging in the recess 18. Fast to one end of the shaft 33 beyond its bearings is a hub 37 carrying a yoke strap 38 in embracing relation to the cam 29, so that when the cam is rotated a rocking movement is imparted to the shaft 33, and this rocking movement is translated into a reciprocatory movement of the slide 12 by means of the finger 35.

Formed on the chute near the lower or discharge end are ears 39, to which is pivoted a frame 40 in embracing relation to the lower end of the chute and constituting in effect a lever. Mounted in this frame-like lever is a roller 41 about coincident with the discharge end of the chute, and this roller is made up of substantially four frusto cones, two of which are joined together at their bases at the middle point of the roller, and the other two at their smaller ends to the smaller ends of the first-named frusto cones, thereby forming two grooves in the roller on opposite sides of the mid-point thereof. The end of the lever remote from the roller 41 is provided with a finger 42 on which is mounted a thumb screw 43 adapted to engage a corresponding portion of the chute 5 to limit the movement of the lever in one direction, and this lever is held normally with the thumb screw 43 in engagement with the chute 5 by a spring 44 fast at one end to the lever, and at the other end to an appropriate point on the chute 5. The lever is movable by hand at any time against the action of the spring 44 by means of a finger-piece 45 on that end of the lever carrying the roller 41.

Mounted on the base 1 near the opposite ends thereof are standards 46, one having a face plate 47 formed thereon and the other a face plate 48, these two face plates being generally similar, but one being formed on that face toward the other, or what may be termed the inner face with an annular groove 49, in which is seated a ring 50 held in place by screws 51 or in any other appropriate manner. The ring 50 has cam projections 52, 53 at appropriate points for purposes which will presently appear, and these cam projections have grooves 54, 55 serving a purpose which will also presently appear. Each standard 46 is formed with a central boss 56 on the outer faces of the respective face plates 47 and 48, and in these bosses is mounted a cylinder 57 constituting a support for certain mechanisms to be described, and this cylinder is held against rotation in any appropriate manner. The member 57 is made hollow for purposes of lightness. Projecting from the boss 56 adjacent the face plate 48 is a stem 58 upon which is mounted a roller 59 having a circumferential groove or channel 60 formed therein in line with the grooves 54 and 55 and intermediate thereof, the roller 59 being substantially midway between the separated ends of the cams 52 and 53. The roller 59 is capable of sliding lengthwise of the stem 58 for a limited distance, but is constrained toward one limit of its movement by a spring 61 between the roller and a collar 62 on the outer end of the stem 58.

Mounted on the support 57 to turn thereon is a sleeve 63 having formed on it adjacent the plate 48 a gear wheel 64 and this sleeve at the end remote from the gear 64 has two spaced radial flanges 65, 66, respectively, the flange 65 being provided with an axially directed extension 67 supported at the end remote from the flange by a collar 68 mounted on the support 57 and the extension 67 carries a cylindrical member 69 terminating in an inturned flange 70 directed toward the longitudinal axis of the support 57.

Mounted in the flanges 65 and 66 is a circular series of sleeves 71 each cut away for about half its circumference between the flanges. Mounted to slide longitudinally in each sleeve 71 is another sleeve 72 extending to and through a bearing in the web of the gear wheel 64 where the sleeve 72 is radially enlarged, as indicated at 73, while the outer end of the enlarged portion of the sleeve is closed by a head 74 having an axial passage therethrough for a purpose which will presently appear. Mounted in that end of the sleeve 72 entering the sleeve 71 is a block 75 having one end projecting from the sleeve 72 and there enlarged to fit the sleeve 71 and also cupped, as indicated at 76, for a purpose which will presently appear. The block 75 has an axial passage therethrough for a rod 77 extending through the axial passage in the head 74 and this rod has fast thereto a collar 78 and is surrounded between said collar and the block 75 by a spring 81 tending to maintain the rod 77 with one end withdrawn from the cup 76 and the other end projecting through and beyond the head 74. Lodged against the enlarged portion 73 of the sleeve 72 is a collar 80 between which and the sleeve 71 the sleeve 72 is surrounded by a spring 79 tending to maintain the sleeve 72 at one limit of its movement, which is in a direction away from the sleeve 71.

Mounted to slide in the end of the sleeve 71 carried by the flange 65 is another sleeve 82 carrying at the end within the sleeve 71 a block 83 like the block 75 and having a terminal cavity 84 like the cavity 76 of the block 75. At a distance from the end of the sleeve 82 engaging the sleeve 71 it is reduced in diameter to the other end and is there threaded to receive a radially extended collar 85 made fast thereto and beveled on the face toward the sleeve. This collar confines another sleeve 86 on the sleeve 82 and also radially projecting rings 87 separated by a spacing ring 88, the sleeve 86 with the rings 87 and spacer 88 occupying the portion of the sleeve 82 of reduced diameter. Entering that end of the sleeve 82 carrying the collar 85 is a shaft 89 along which the sleeve may move longitudinally, but with which it is made to turn by any suitable means usually employed for the purpose, such as a spline or key, as indicated at 90. Carried by the end of the shaft 89 within the sleeve 82 is a rod 91 of sufficient length to extend through the block 83 into the cavity 84. Surrounding the rod 91 within the sleeve 82 is a spring 92. The tendency of this spring is to force the sleeve 82 with the block 83 carried thereby toward the block 75. The shaft 89 is continued through the flange 70 in which it has a bearing and there carries a gear pinion 93 in the path of which is a rack segment 94 pivoted at one end upon the corresponding face of the face plate 47 and at the other end limited in its movement about its pivot by a stop pin 95 on the plate 47 and extending into a slot 96 in the rack 94. A spring 97 carried by the plate 47 tends at all times to keep the rack 94 into engagement with any pinion 93 reaching it.

The supporting member 57 carries a cam 98 in position to engage the collar 85 to move the sleeve 82 against the tendency of the spring 92, and this cam has its continuity broken at a certain point to permit an action to be described.

Mounted upon the support 57 is a cylindrical member 99 fixed to the support by a set screw 100 or otherwise, and this cylindrical member is provided with spaced radial flanges 101. Extending between these flanges is a rod 102 serving as a pivot support for an appropriate number of dogs 103, each of which may be comparatively thin, and on one edge is formed with a tooth 104, and at the end remote from the pivot with a finger 105 in the path of which is another rod 106 mounted in the flanges 101, and extending between them. Each dog 103 is controlled by a spring 107 engaging still another rod 108 mounted in and extending between the flanges 101. The dogs 103 are sufficient in number to extend from one flange 101 to the other flange 101, and are of such thickness and number that two or three or more of them may lodge between the rings 87 at one time, but the distance between these rings is greater than the combined thickness of a predetermined number of the dogs and less than the combined thickness of one more than such predetermined number, so that when the rings 87 are opposite the dogs the predetermined number of dogs will engage between the rings, but which of the dogs engage between the rings is determined by the position of these rings with relation to the dogs and this position may vary after engagement with the dogs by less than the thickness of the dog, and preferably by half the thickness of a dog.

Mounted on the base 1 is a bracket 109 carrying spring fingers 110 positioned to pass into close engagement with the sleeves 71 where cut away for a purpose which will presently appear.

Mounted in bearings 111 erected on the base is a power shaft 112 carrying a pinion 113 meshing with the gear wheel 64 and this power shaft may receive power from a suitable belt, the shaft being provided with a pulley 114 for the application of power, but this pulley may be taken as indicative of any suitable means for rotating the power shaft 112. The power shaft also carries a pulley 115 connected by a belt 116 to the pulley 30.

Figures 1, 7:
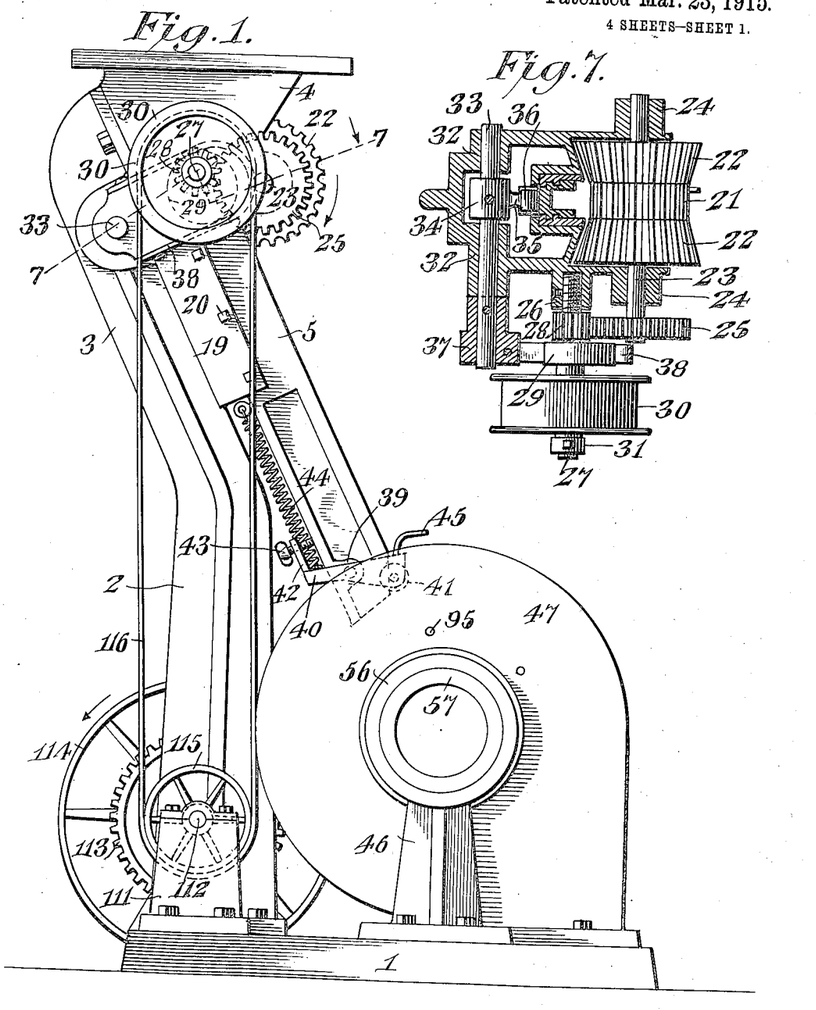
—Figure 1 is an end elevation of the machine.
Fig. 7 is a section on the line 7—7 of Fig. 1 with some parts in elevation and distant parts omitted.
Figure 2:
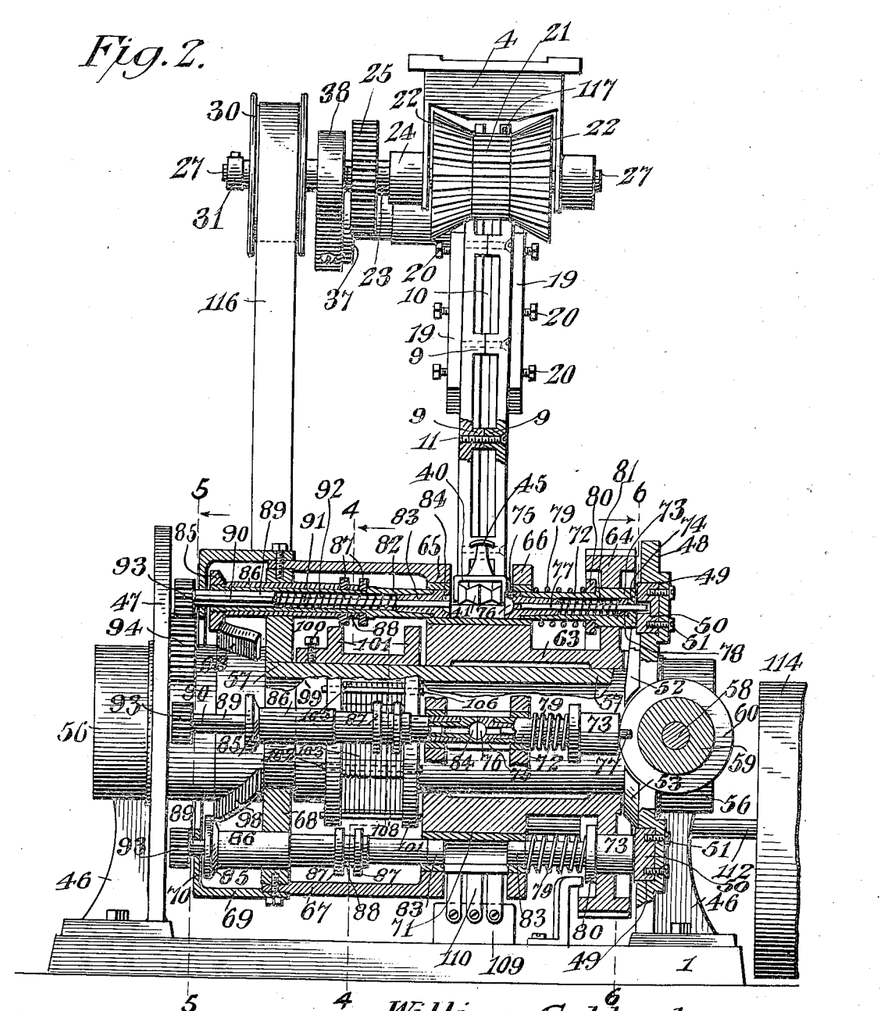
Fig. 2 is a front elevation with some parts in diametric section on a vertical plane, some parts being shown in elevation, and other parts nearer to the observer than the first-named parts being shown in elevation and in vertical section.
Figures 3, 9:
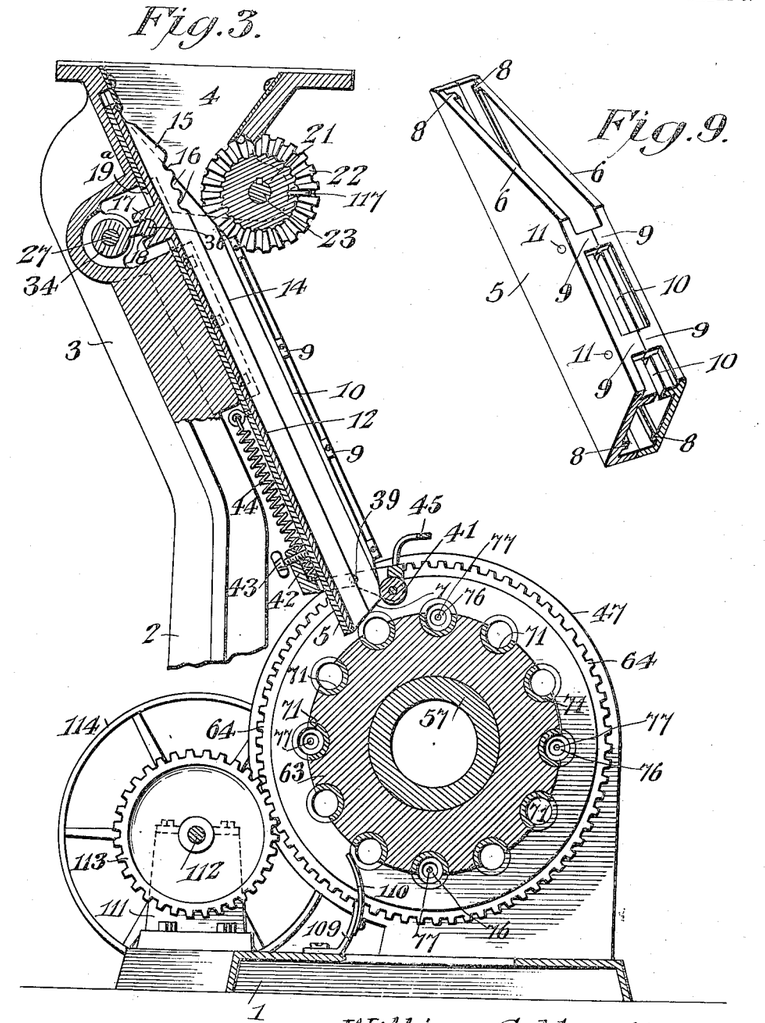
Fig. 3 is a vertical section of the machine in a direction from front to rear and substantially central to the feed chute, some parts being shown in elevation and broken away.
Fig. 9 is a perspective view of the upper end of the feeding chute in which the corresponding portion of the reciprocatory member is lodged.
Figure 4:
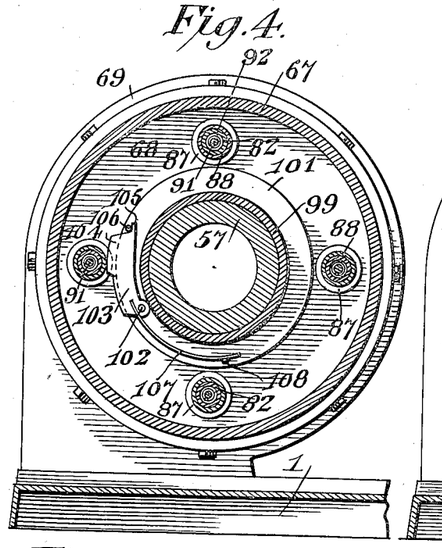
Fig. 4 is a section on the line 4—4 of Fig. 2.
Figure 5:
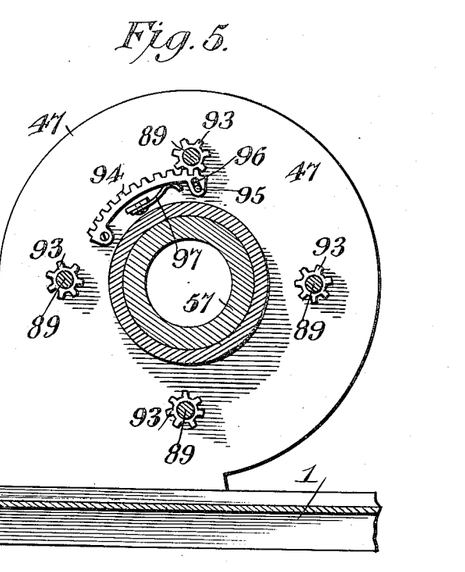
Fig. 5 is a section on the line 5—5 of Fig. 2.
Figures 6, 8, 10:
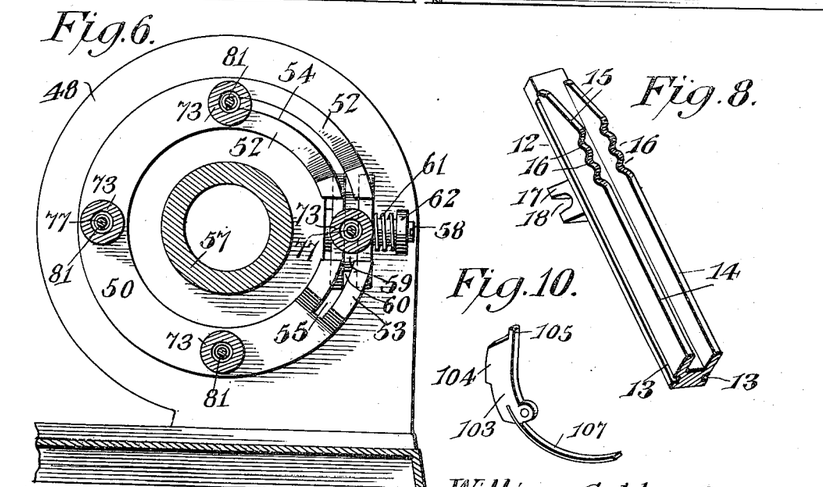
Fig. 6 is a section on the line 6—6 of Fig. 2.
Fig. 8 is a perspective view of a portion of a reciprocatory member lodged within the feeding chute.
Fig. 10 is a perspective view of a dog employed in connection with a portion of the nut cracking elements of the structure.

Let it be assumed that a suitable supply of pecans or other nuts are lodged within the hopper 4 and that the machine is in operation with the shaft 112 rotating counterclockwise as viewed in Fig. 1 and indicated by the arrow adjacent the pulley 114. This movement of rotation through the pinion 113 will cause a clockwise movement of the gear 64 as this gear is viewed in Fig. 3. The belt 116 imparts to the pulley 30 a counterclockwise movement like that of the pulley 114, and this movement through the pinion 28 and gear wheel 25 causes the roller or drum 21 to rotate in a clockwise direction as viewed in Fig. 1, wherefore that portion of the roller entering the hopper 4 moves in an upward direction. At the same time a reciprocatory movement is imparted to the sliding member 12 within the chute 5.

Pecans, which will be considered as the nuts to be cracked, are caused by the combined movements of the roller 21 and notched upper ends of the sides 14 of the reciprocatory member 12 to pass one by one lengthwise into the chute. Should, however, it happen that the pecans fail to move endwise into the chute but lie crosswise on the top thereof, the roller or drum 21 is provided with pins 117 at opposite sides of the center line of the chute, so that the improperly lodged pecan is caught by one or the other of the pins and upended to fall endwise into the chute. When the pecans reach the lower end of the chute they are directed toward one end or the other of the pockets formed by the cut away portions of the sleeves by means of the grooved roller 41, and, therefore, drop into these pockets lengthwise thereof to be immediately afterward caught between the jaws formed by the blocks 75 and 83 with the ends of the pecans in the sockets 76 and 84, which sockets may be constructed as shown in the aforesaid Letters Patent, such construction not being illustrated in this application, but may be assumed to be present. After a nut is deposited in the pocket formed by the cut away sleeve 71 under consideration the rotation of the member 63 under the action of the gear 64 causes the cam 52 to act upon the sleeve 72 to move the block 75 into engagement with the corresponding end of the nut, while the cam 98 releases the sleeve 82 to the action of the spring 92 so that the sleeve 82 is moved into engagement with the nut, which latter is thereby held at the ends in the sockets 76 and 84, the rods 77 and 91 in the meantime maintaining their respective positions, the rod 91 at no time moving axially, while the rod 77 has a limited axial movement for a purpose to be described. The pinion 93 now engages the rack 94 in its path and a rotative movement is imparted thereby to the sleeve 82, thus tending to center the nut between the two blocks 75 and 83. The continued rotative movement of the carrying member for the parts mentioned causes an axial movement of the sleeve 82 until the nut is firmly gripped, and by this time the rings 87 have reached the dogs 103 and the teeth or extensions 104 of the dogs have engaged between the rings, thus locking the sleeve 82 against further axial movement in either direction so long as this engagement continues, except a slight longitudinal movement permitted to cause engagement of one of the rings 87 with the side of the corresponding dog if not already in engagement therewith. While the sleeve 82 is thus locked, the roller 59 is engaged by the closed end 74 of the sleeve 72 and as this roller projects a distance beyond the active face of the cam 52 the sleeve 72 is forced toward the sleeve 82 and a nut lodged between them is there cracked, since it is the only thing offering resistance to the movement described. At the same time the grooves 54 and 60 permit the pin 77 to remain in its retracted position. By the time the operations described have been completed, the continued rotative movement of the parts carrying the nut cracking mechanisms has caused the latter to pass beyond the ends of the roller 59 and the sleeve 72 is released to the action of the spring 81 to be retracted while the rings 87 have escaped from the dogs 103 and the continuation of the cam 98 engaging the collar 85 has caused a movement of the sleeve 82 against the action of the spring 92, so that both blocks 75 and 83 have been withdrawn from the pocket containing the nut and as this pocket is now inverted, the nut will gravitate into any suitable receptacle. To eject any shells which may adhere in the sockets 76 or 84, or both, the pins 77 and 91 have now entered the pockets, the pin 91 being of sufficient length to enter the pocket 84 when the block 83 is in the retracted position, while the cam ring 50 is now in the path of the corresponding end of the pin 77 and forces the same into the pocket 76 against the action of the spring 79. Should it transpire that the cracked nut does not readily gravitate from the pocket in the sleeve 71, it will be discharged therefrom by engagement with the spring fingers 110.

The foregoing description has been confined to the action of a single nut cracking mechanism, but as there is a circular series of such mechanisms each in turn will receive a nut and cause it to be cracked and to be then discharged from the machine.

The present device is designed for the same purpose as that described in the aforesaid patent, and it is therefore unnecessary to here repeat the general purposes and advantages of the machine, since the present invention is an improvement upon a machine of the same character as that set forth in the aforesaid Letters Patent.

It sometimes occurs that the nuts may jam within the chute, and if this should be the case they are easily dislodged by the insertion of any suitable instrument into the chute through the appropriate one of the slots 10.

The present invention has to do with an improvement of different portions of the mechanism of a machine of the character of that described in the aforesaid patent, whereby the efficiency of the machine is markedly increased, although its general operation does not differ from that of the machine of the said patent.

What is claimed is:—

1. In a nut cracking machine, nut cracking mechanism, a hopper, a chute entering the hopper and leading therefrom to the nut cracking mechanism, a reciprocatory device on the chute having nut engaging parts at the nut entering end, and a rotatable lifting device entering the hopper and chute in coactive relation with the reciprocatory member for causing the nuts to assume a predetermined position within the reciprocatory device and chute.

2. In a machine for cracking nuts, nut cracking mechanism, and a feed chute having a substantially U-shaped nut engaging member extending lengthwise of the chute and reciprocatory in the direction of its length, said chute being open where coinciding with the open side of the nut engaging member to expose nuts therein to view.

3. In a nut cracking machine, nut cracking mechanism, a feed chute for delivering nuts thereto, said feed chute being provided with a substantially U-shaped nut engaging member movable lengthwise thereof, and means for imparting restricted longitudinal reciprocation to said nut engaging member, said chute being open where coinciding with the open side of the nut engaging member to expose nuts therein to view.

4. In a nut cracking machine, nut cracking mechanism, and feeding mechanism for the nuts leading to the nut cracking mechanism, said feeding mechanism being provided with agitating means for the nuts extending lengthwise thereof to cause feeding of the nuts endwise to the nut cracking mechanism, and means at the delivery end of the feeding mechanism shaped to divert nuts laterally of and into positions substantially perpendicular to their direction of movement through the feeding mechanism.

5. In a nut cracking machine, nut cracking mechanism, and a feeding means therefor comprising an elongated chute open along one side and provided at the end remote from the nut cracking mechanism with a hopper or receptacle for nuts, a reciprocatory substantially U-shaped member within the chute extending lengthwise thereof for substantially the length of the chute, and a rotatable agitator having its axis of rotation transverse to the length of the chute and extending into the hopper to lift the nuts at the receiving end of the chute, said agitator having its ends diametrically expanded with respect to its central portion.

6. In a nut cracking machine, nut cracking mechanism, and means for feeding nuts thereto comprising an elongated chute having a hopper at the end remote from the nut cracking mechanism, a slidable member within the chute of substantially the same length as the chute and provided with spaced side walls extending into the hopper, agitating means for the nuts at the nut entering end of the chute, means for reciprocating the slidable member, and an agitating roller entering the hopper adjacent the entering end of the chute, said roller having peripheral teeth and expanding from a central portion toward the ends.

7. In a nut cracking machine, nut cracking mechanism, and means for feeding nuts thereto comprising an elongated chute having a hopper at the end remote from the nut cracking mechanism, a slidable member within the chute of substantially the same length as the chute and provided with spaced side walls extending into the hopper, agitating means for the nuts at the nut entering end of the chute, means for reciprocating the slidable member, and an agitating roller entering the hopper adjacent the entering end of the chute, said roller having peripheral teeth and expanding from a central portion toward the ends, the roller being also provided with nut engaging pins on opposite sides of its middle to enter the hopper and upend nuts lodged crosswise of the mouth of the chute.

8. In a machine for cracking nuts, nut cracking mechanism, and a feeding means for the nuts comprising a chute, a hopper delivering to the chute, and agitating means for nuts within the hopper comprising a roller having an intermediate cylindrical portion and expanding end portions with both portions provided with peripheral teeth.

9. In a machine for cracking nuts, nut cracking mechanism, and a feeding means for the nuts comprising a chute, a hopper delivering to the chute, and agitating means for nuts within the hopper comprising a roller having an intermediate cylindrical portion and expanding end portions with both portions provided with peripheral teeth, said roller having projecting members thereon in position to engage the end portions of nuts extending transversely of the mouth of the chute and to upend such nuts and direct them endwise into the chute.

10. In a nut cracking machine, nut cracking mechanism, a feeding chute for nuts leading to the nut cracking mechanism, and a direction changing means for nuts at the delivery end of the feeding chute comprising a gravity roller having grooves on opposite sides of the center line of the chute.

11. In a nut cracking machine, nut cracking mechanism, a feeding chute for nuts leading to the nut cracking mechanism, and a direction changing means for nuts at the delivery end of the feeding chute comprising a gravity roller having grooves on opposite sides of the center line of the chute, a lever support for the roller, a spring for imparting normal tendency for the roller to move in one direction, means for controlling the extent of movement of the roller in the direction controlled by the spring, and means for the manual operation of the roller carrying means.

12. In a nut cracking machine, a base or support, nut cracking mechanism movably mounted thereon and including a movable carrier, and nut cracking members movable thereon and therewith, a standard mounted on the base, a hopper supported by the standard, a delivery chute extending longitudinally of the standard from the hopper to the nut cracking mechanism, means for causing the nuts to move end to end from the hopper through the chute, and a roller having grooves on opposite sides of the center line of the chute for changing the direction of the nuts on entering the nut cracking mechanism.

13. In a nut cracking machine, a base or support, nut cracking mechanism movably mounted thereon and including a movable carrier, and nut cracking members movable thereon and therewith, a standard mounted on the base, a hopper supported by the standard, a delivery chute extending longitudinally of the standard from the hopper to the nut cracking mechanism, means for causing the nuts to move end to end from the hopper through the chute, and a roller having grooves on opposite sides of the center line of the chute for changing the direction of the nuts on entering the nut cracking mechanism, the chute having a longitudinally reciprocable member for engaging the nuts while in the chute and while in the hopper, and the latter being provided with an agitator for lifting and engaging with the nuts therein.

14. In a nut cracking machine, a rotatable carrier, relatively movable nut fracturing members mounted on and movable with the carrier, means for moving said nut fracturing members toward and from each other, a plural lock for holding one of said members against retractive movement, said lock being in the path of said member and mounted on and held against rotation by a fixed part of the machine, and means for moving the other nut fracturing member toward the first-named member to cause the fracturing of the shell of the nut while said first-named member is engaged by the lock.

15. In a nut fracturing machine, a rotatable carrier, relatively movable nut fracturing members mounted on and rotatable with the carrier, means for causing a preliminary movement of the nut fracturing members to engage a nut, a lock mounted upon a fixed portion of the machine in the path of one of said members during its rotation with the carrier and comprising a plurality of independent dogs in position to engage the said nut fracturing member during its rotative movement, and means for imparting active movement to the other nut fracturing member while the first-named member is engaged and locked by the dogs.

16. In a nut cracking machine, a movable carrier, oppositely located nut fracturing members on and movable with the carrier and arranged to receive a nut between them, a lock for one of the members fixed against participation in the movement of said member with the carrier, and means on said member for selectively engaging a number of dogs less than the total number.

17. In a nut cracking machine, a movable carrier, oppositely located nut fracturing members on and movable with the carrier and arranged to receive a nut between them, a lock member mounted on a fixed portion of the machine in the path of one of the nut fracturing members when moving with the carrier and comprising a plurality of closely adjacent associated dogs having portions in the path of said one of the nut cracking members when moving with the carrier, and said one of the nut cracking members having means coacting with the dogs to be engaged by a number of said dogs less than the total number and depending upon the relative position of the nut fracturing member transversely of the associated dogs.

18. In a nut cracking machine, a movable carrier, oppositely located nut fracturing members on and movable with the carrier and arranged to receive a nut between them, a lock carried by a fixed part of the machine and arranged in the path of one of the nut fracturing members when moving with the carrier, said lock comprising a plurality of closely associated dogs each composed of a pivoted plate having a projecting portion to engage the nut fracturing member and provided with means for constraining it toward said nut fracturing member, and the latter having spaced means co-acting with the dogs to receive between said spaced means and engage a number of the dogs less than the total number and dependent upon the relative position of the nut fracturing member.

19. In a nut cracking machine, a movable carrier, oppositely located nut fracturing members on and movable with the carrier and arranged to receive a nut between them, and a lock for one of the movable nut fracturing members comprising spaced lock engaging means on said member, and a series of flat plates in close side by side arrangement and mounted against participation in the movement of the carrier, each dog having a projecting member movable into the space between the spaced members of the nut fracturing member to be locked, a spring for urging the jaw toward the nut fracturing member, and means for limiting the movement of the jaw under the action of the spring, the spacing of the spaced members of the nut fracturing member being greater than the combined thickness of a predetermined number of adjacent plates, and less than one more than that number.

20. In a nut cracking machine, a rotatable carrier, a plurality of pairs of oppositely located nut fracturing members mounted on and movable with the rotatable carrier about its axis of rotation, each pair of nut fracturing members being arranged to receive a nut between them, and a lock common to all the pairs of nut fracturing members and mounted on a fixed portion of the machine and there held in the path of rotation of one of the nut fracturing members of each pair, said lock comprising a series of closely associated independent lock members and each nut fracturing member in the path of which the lock is located, being provided with spaced lock engaging members separated by a distance greater than the combined thickness of a predetermined number of the lock members and less than one more than that number.

21. In a nut cracking machine, nut cracking mechanism, a feed chute for nuts leading to the nut cracking mechanism, and a direction-changing means for nuts at the delivery end of the feed chute comprising a roller having grooves on opposite sides of the center line of the chute.

22. In a nut cracking machine, a feed chute, and agitating means for the nuts at the nut entering end thereof comprising an agitating roller having peripheral teeth extended lengthwise of the roller and the latter expanding from a central portion toward the ends.

23. In a nut cracking machine, a feed chute, and agitating means for the nuts at the nut entering end thereof comprising an agitating roller having peripheral longitudinally extended teeth and expanding from a central portion toward the ends, said roller being also provided with nut engaging pins on opposite sides of its middle portion.

24. In a nut cracking machine, a feeding means for nuts, comprising an elongated chute having a hopper at one end and a slidable member within the chute provided with spaced side walls extending into the hopper and there beveled and adjacent the beveled portion formed with a series of notches defining blunt teeth between them.

25. In a nut cracking machine, a feeding means for nuts, comprising an elongated chute having a hopper at one end and a slidable member within the chute provided with spaced side walls extending into the hopper and there beveled and adjacent the beveled portion formed with a series of notches defining blunt teeth between them, the rear face of the slidable member having a recessed block thereon and the chute having a slot for the passage of the block, and a rockable member engaging in the recessed block for imparting reciprocatory movements to the slidable member.

In testimony, that I claim the foregoing as my own, I have hereto affixed my signature in the presence of two witnesses.

WILLIAM GEBHARDT.

Witnesses:
A. WIDENFELD,
JOHN BIASIALLI.